May 12, 1959 — D. C. LANTZ — 2,886,122
REFUSE CONVERTERS
Filed July 18, 1957 — 2 Sheets-Sheet 2
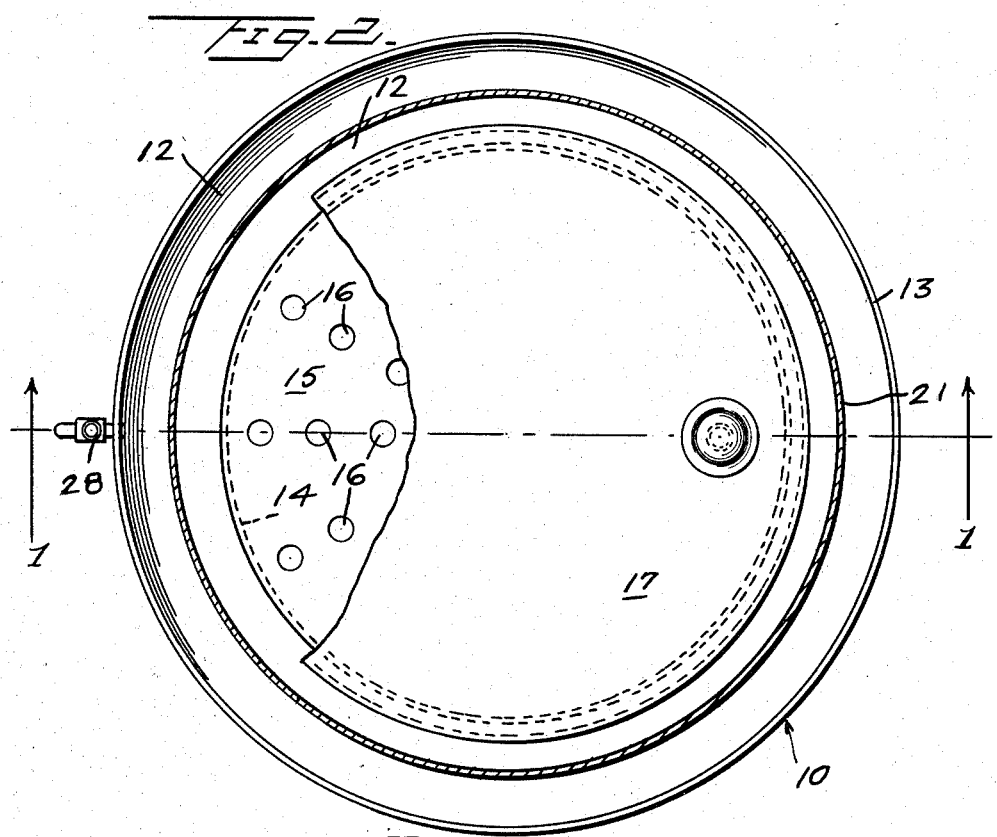
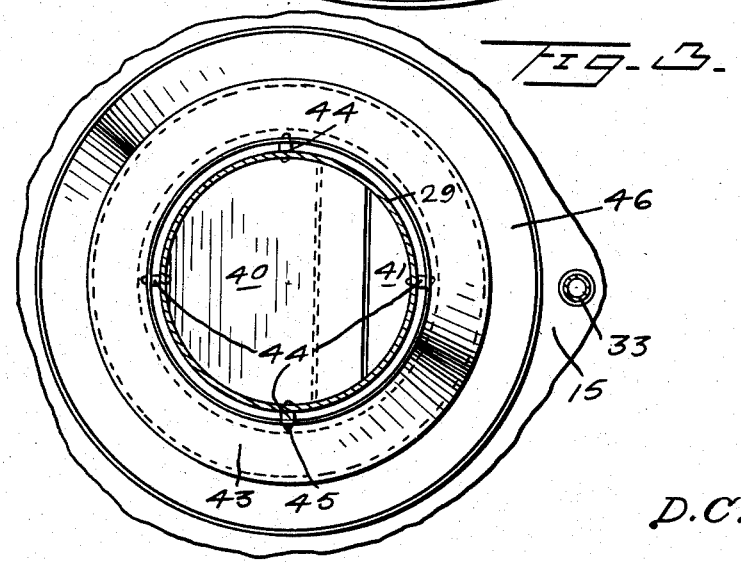
INVENTOR
D. C. Lantz
BY Kimmel & Crowell
ATTORNEYS

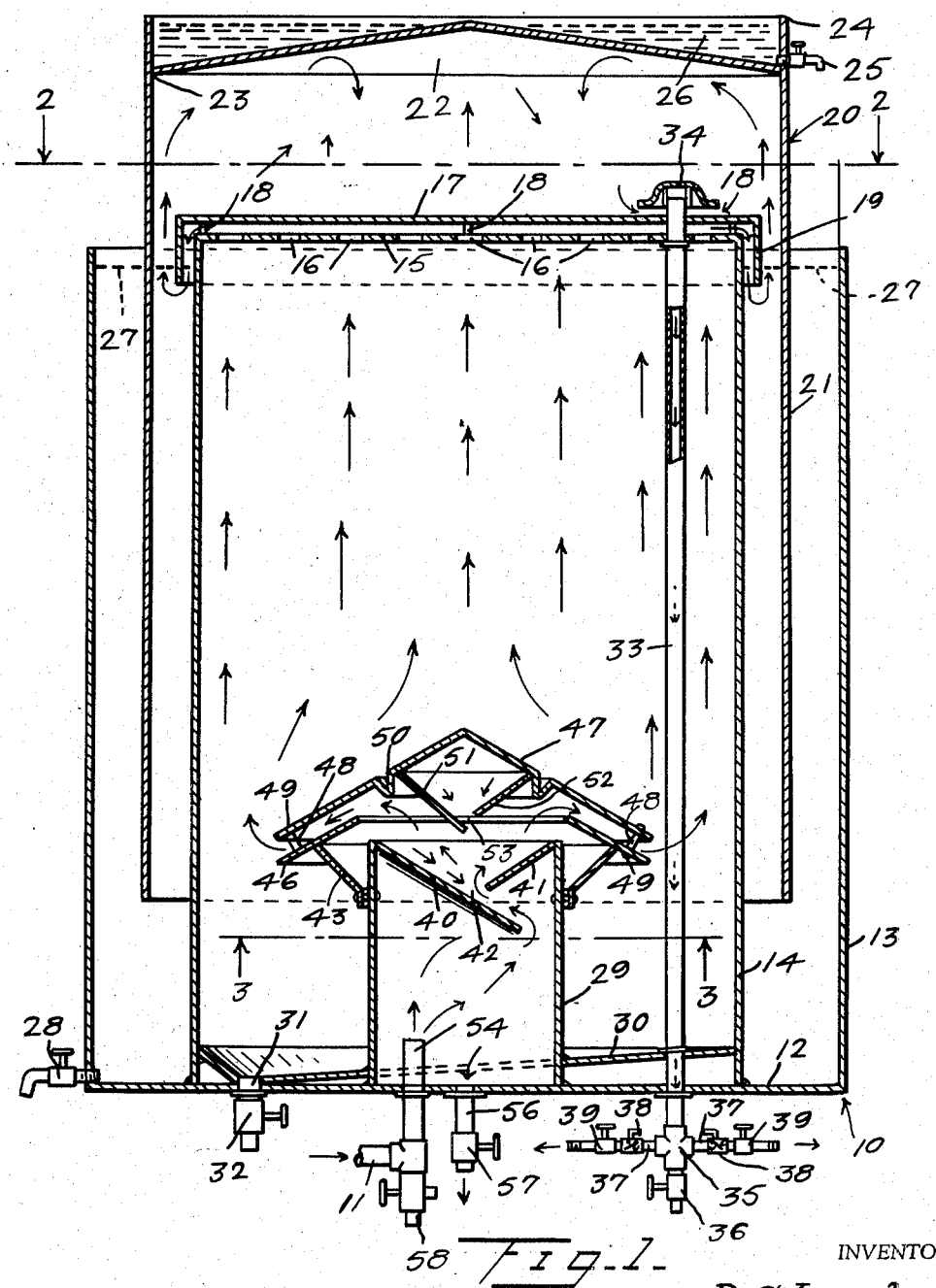

2,886,122
REFUSE CONVERTERS

Dae C. Lantz, Burbank, Calif., assignor to Pan American Resources, Inc., New Castle, Del., a corporation of Delaware Application July 18, 1957, Serial No. 672,743

4 Claims. (Cl. 183—2)

The present invention relates to refuse converters of the type used for reclaiming usable materials from the refuse.

The primary object of the invention is to provide an apparatus for reclaiming usable material from refuse.

Another object of the invention is to provide an apparatus of the class described above in which vapors emanating from refuse may be condensed to collect the liquids trapped therein.

A further object of the invention is to provide a refuse converter in which gas emanating from the refuse is cleaned and collected for use.

A further object of the invention is to provide a refuse converter of the class described above which is inexpensive to manufacture, easy to use, and which completely collects all usable material from the refuse vapors.

Other objects and advantages will become apparent in the following specification when considered in the light of the attached drawings, in which:

Figure 1 is a vertical cross-section of the invention taken along the line 1—1 of Figure 2, looking in the direction of the arrows.

Figure 2 is a horizontal cross-section taken along the line 2—2 of Figure 1, looking in the direction of the arrows.

Figure 3 is an enlarged fragmentary horizontal cross-section taken along the line 3—3 of Figure 1, looking in the direction of the arrows.

Referring now to the drawings in detail wherein like reference characters indicate like parts throughout the several figures, the reference numeral 10 indicates generally a refuse converter recovery unit constructed in accordance with the invention.

The unit 10 is used with a refuse retort (not shown) of the type in which the refuse is reduced to charcoal by indirectly applied heat and gives off a vaporous gas which enters the unit 10 through the conduit 11.

The unit 10 includes a circular bottom wall 12 and a cylindrical outer wall 13 secured thereto and extending upwardly therefrom. A cylindrical inner wall 14 is arranged concentrically of the outer wall 13 and is secured to the bottom wall 12 by welding or other suitable means. The inner wall 14 has a height substantially equal to the outer wall 13 and is provided with a perforate top wall 15 having a plurality of openings 16 extending therethrough.

A secondary cover 17 is spaced slightly above the perforate cover 15 and is supported thereabove by spacer blocks 18 extending between the perforate cover 15 and the secondary cover 17. The secondary cover 17 has a diameter somewhat greater than the diameter of the perforate cover 15 and carries a peripheral depending flange 19 thereon which extends concentrically past the upper edge of the inner wall 14 in spaced relation thereto.

A gas tank, generally indicated at 20, comprises a cylindrical wall 21 having a diameter intermediate the diameter of the outer wall 13 and the inner wall 14. The tank 20 has a relatively flat conical top wall 22 secured peripherally to the cylindrical wall 21 along a line 23 parallel to but spaced below the top edge 24 of the cylindrical wall 21.

A drain valve 25 is mounted in the cylindrical wall 21 above the line 23 communicating with the space above the conical wall 22 so that fluid 26 held in the area delineated by the upper surface of the conical wall 22 and the portion of the cylindrical wall 21 lying between the line 23 and the top edge 24 thereof may be drained as desired.

Fluid is held in the area between the outer wall 13 and the inner wall 14 rising to the height indicated by the dotted line 27. A drain valve 28 extends through the outer wall 13 adjacent the bottom wall 12 to drain the fluid between the outer wall 13 and the inner wall 14 when desired.

A cylindrical chamber 29 is secured to the bottom wall 12 centrally thereof and extends upwardly therefrom concentrically to the outer and inner walls 13 and 14, respectively. A sloping false bottom wall 30 is positioned above the bottom wall 12 between the inner wall 14 and the cylindrical chamber 29 to conduct liquids thereon to a drain conduit 31 controlled by a drain valve 32.

A conduit 33 extends perpendicularly through the bottom wall 12, the false wall 30, the perforate top wall 15, and the secondary cover 17 to provide an outlet from the gas tank 20. A baffle 34 is secured to the upper end of the conduit 33 to prevent surges of pressure through the conduit 33.

The lower end of the conduit 33 has a four-way fitting 35 secured thereto to provide a connection for a drain valve 36 and oppositely disposed gas feed lines 37. The gas feed lines 37 are respectively controlled by adjustable check valves 38 and hand shut-off valves 39.

The upper end of the cylindrical chamber 29 is provided with a pair of oppositely disposed downwardly sloping imperforate baffles 40, 41 arranged with a passage 42 extending therebetween. An annular outwardly and upwardly flaring shield 43 is arranged in encompassing relation to the cylindrical chamber 29 and is separated therefrom by spacers 44. Securing elements 45 extend through the shield 43, the spacers 44, and the cylindrical chamber 29 to secure the shield 43 to the chamber 29.

An upwardly and inwardly sloping annular plate 46 has its medial portion secured to the upper outer terminal end of the shield 43, as can be best seen in Figure 1. A conical cap 47 is positioned parallel to the plate 46 in upwardly spaced relation and is mounted on spacers 48 extending therebetween and is held thereon by securing elements 49.

The conical cap 47 has a circular baffle forming fold 50 arranged spaced from but adjacent to the apex of the conical cap 47. A pair of downwardly and inwardly sloping baffles 51, 52 are secured to the conical cap 47 adjacent the fold 50 and are arranged with their lower terminal ends in spaced relation to provide a passage 53 therebetween.

The pipe 11 extending from the refuse retort (not shown) terminates at 54 within the cylindrical chamber 29 so that the gas and vapors from the refuse will be exhausted into the chamber 29.

A drain line 56 extends through the bottom wall 12 communicating with the chamber 29 and has a hand control valve 57 attached thereto, as can be seen in Figure 1.

In the use and operation of the invention, gas flowing through the pipe 11 past the drain valve 58, enters the chamber 29 and a portion of the creosote tar values in the gas condense to flow outwardly through the drain line 56. The gas flows upwardly about the baffles 40, 41 and about the baffles 52, 51 between the cap 47 and the plate 46 into the tank formed by the inner wall 14 and the perforate upper wall 15.

As the gas passes over the baffles 40, 41, 51, 52 and around the plate 46 and cap 47 additional creosote tar values condense thereon and drain into the chamber 29 and out the drain line 56.

Water in the unit between the outer wall 13 and the inner wall 14 seals the tank 20 and the depending flange 19 as well as cools the inner wall 14 to create additional condensation.

Water and additional creosote tar values condense on the inner surface of the inner wall 14 and drain downwardly through the drain valve 32. The gas flows upwardly through the opening 16 in the perforate wall 15 and bubbles through the water under the flange 19 and up into the tank 20.

The tank 20 floats on the water between the inner wall 14 and the outer wall 13 and moves upwardly and downwardly to accommodate the gas volume contained therein. The water 26 serves as a weight on the tank 20 to maintain the gas therein under pressure so that it may be dispensed through the pipe 33 at a desired pressure.

The unit 10 produces dry scrubbed gas which can be used to burn for heat, light, power, refrigeration, and other purposes as desired. Additionally, the unit 10 produces creosote and creosote tar values of commercial importance.

Having thus described the preferred embodiment of the invention, it should be understood that numerous structural modifications and adaptations may be resorted to without departing from the scope of the appended claims.

What is claimed is:

1. A refuse converter unit comprising an outer open top tank, a closed top inner tank concentrically arranged with respect to said outer tank and secured therein, said tanks being arranged in spaced relation and having water in the space between, a gas tank having an open bottom with the side walls thereof immersed in the water between said inner and outer tanks, said gas tank floating on said water and being sealed thereby, means on the upper end portion of said inner tank communicating said inner tank with said gas tank to permit flow of gas from said inner tank to said gas tank through a portion of the water between said inner and outer tanks, and means in said inner tank for separating and drying gas introduced therein.

2. A device as claimed in claim 1 wherein said means on the upper end of said inner tank includes a perforate top wall, and a secondary cover arranged in spaced relation above said top wall and having a depending flange immersed in the water between said inner and said outer tanks.

3. A device as claimed in claim 1 wherein the means for separating gas comprises a chamber positioned in said inner tank and having a plurality of angularly related baffles positioned therein for condensing vapors from said gas.

4. A device as claimed in claim 1 wherein said gas tank is provided with a liquid ballast tank on the upper end thereof for increasing the weight of said gas tank to vary the pressure of the gas contained therein.

References Cited in the file of this patent

UNITED STATES PATENTS

| 2,792,070 | Strunk | May 14, 1957 |

FOREIGN PATENTS

| 8,516 | Great Britain | Apr. 11, 1902 |